(12) United States Patent
Smith et al.

(10) Patent No.: US 8,539,995 B2
(45) Date of Patent: Sep. 24, 2013

(54) COUPLING LOCK AND ATTACHMENT MODULE AND DOCKING DEVICE, EACH CONTAINING SAID COUPLING LOCK

(75) Inventors: Thomas Marsden Smith, Brookhaven, PA (US); Peter Lais, Muellheim (DE); Martin Koch, Muellheim (DE)

(73) Assignee: GEA Pharma Systems AG, Bubendorf (CH)

( * ) Notice: Subject to any disclaimer, the term of this patent is extended or adjusted under 35 U.S.C. 154(b) by 1001 days.

(21) Appl. No.: 12/568,625

(22) Filed: Sep. 28, 2009

(65) Prior Publication Data

US 2010/0084049 A1    Apr. 8, 2010

(30) Foreign Application Priority Data

Sep. 26, 2008   (DE) .......................... 10 2008 049 129

(51) Int. Cl.
   *B65B 3/04*      (2006.01)
   *B65B 1/04*      (2006.01)
   *F16L 37/30*     (2006.01)

(52) U.S. Cl.
   USPC .................. 141/383; 137/614.04; 137/614.06

(58) Field of Classification Search
   USPC ........ 141/383–386; 137/614, 614.01–614.06
   See application file for complete search history.

(56) References Cited

U.S. PATENT DOCUMENTS

| | | | | |
|---|---|---|---|---|
| 5,295,507 A * | 3/1994 | Bandy et al. | ............. | 137/614.06 |
| 5,718,270 A * | 2/1998 | Grau et al. | ..................... | 141/383 |
| 6,308,749 B1 * | 10/2001 | Brossard et al. | ................ | 141/91 |
| 6,315,013 B1 * | 11/2001 | Lardieri | ......................... | 141/383 |
| 6,357,488 B1 * | 3/2002 | Brossard et al. | ................... | 141/1 |
| 6,383,315 B1 | 5/2002 | Kreipe | | |
| 6,412,518 B1 | 7/2002 | Pieri | | |
| 6,789,780 B2 * | 9/2004 | Pieri | ............................. | 251/175 |
| 6,807,979 B2 * | 10/2004 | Koch et al. | ..................... | 137/240 |
| 6,913,048 B2 * | 7/2005 | Koch et al. | ..................... | 141/346 |

(Continued)

FOREIGN PATENT DOCUMENTS

DE    20 2007 013675 U1    3/2008
EP        0 928 921 A1    7/1999

(Continued)

OTHER PUBLICATIONS

Machine translation of EP 1749770, Feb. 2007, all pages.*

(Continued)

*Primary Examiner* — Gregory Huson
*Assistant Examiner* — Nicolas A Arnett
(74) *Attorney, Agent, or Firm* — Christensen O'Connor Johnson Kindness PLLC

(57) ABSTRACT

Coupling locks, attachment modules, and docking devices allow for re-filling, filling and/or emptying of containers in a manner that is insulated against the environment. An attachment module includes a coupling lock and a locking clamp, where the coupling lock includes a pipe nozzle and a closing flap. A first clamping element is located on an outer side of the pipe nozzle to engage with a second clamping element by means of the locking clamp to create a temporary connection. A docking device includes the first coupling lock or the attachment module, and a second coupling lock, complementary to the first coupling lock. When the closing flaps of the first and second coupling locks are brought into contact with each other, they can be pivoted from a closed position, where they lock the transfer channel formed by the pipe nozzles, around a shared axis into an open position.

36 Claims, 6 Drawing Sheets

(56) References Cited

U.S. PATENT DOCUMENTS

| | | |
|---|---|---|
| 2002/0158086 A1 | 10/2002 | Pieri |
| 2004/0094211 A1 | 5/2004 | Koch |
| 2004/0099335 A1 | 5/2004 | Koch |
| 2010/0084049 A1* | 4/2010 | Smith et al. .............. 141/383 |
| 2010/0126622 A1* | 5/2010 | Koch et al. ................ 141/1 |
| 2011/0088353 A1* | 4/2011 | Lais et al. ................. 53/381.1 |

FOREIGN PATENT DOCUMENTS

| | | |
|---|---|---|
| EP | 1 043 252 A1 | 10/2000 |
| EP | 1 083 137 B1 | 3/2001 |
| EP | 1 313 658 B1 | 5/2003 |
| EP | 1 315 662 B1 | 6/2003 |
| EP | 1749770 * | 2/2007 |
| EP | 1 947 039 A1 | 7/2008 |
| JP | 2006057758 A | 3/2006 |
| WO | 2008071181 A2 | 6/2008 |

OTHER PUBLICATIONS

German Examination Report, mailed Jul. 1, 2009, issued in corresponding Application No. 10 2008 049 129.2-27, filed Sep. 26, 2008.

European Search Report mailed Nov. 16, 2011, in European Patent Application No. 09 01 2188, filed Sep. 25, 2009, 2 pages.

* cited by examiner

COUPLING LOCK AND ATTACHMENT MODULE AND DOCKING DEVICE, EACH CONTAINING SAID COUPLING LOCK

BACKGROUND

The present invention relates to a coupling lock for the re-filling, filling and/or emptying of containers, in particular in a manner which is insulated against the environment, and an attachment module and a docking device, which each contain said coupling lock according to the invention.

Coupling locks for the contamination-free re-filling, filling or emptying of containers are used in a wide variety of ways in the further processing industry. Coupling locks of this type are also known as half-flaps or butterfly flaps. When two such complementary coupling or half-flap locks are used, a docking device is obtained with reciprocal docking, with the aid of which toxic bulk material can also usually be transferred in a manner which is insulated from the environment. Coupling locks and docking devices of this type are disclosed, for example, in EP 1 083 137 B1, EP 1 313 658 B1 and EP 1 315 662 B1.

Attempts to achieve a very high degree of purity have, as can be derived, e.g., from EP 1 313 658 B1, extended, for example, to temporarily creating a cleaning area between the front sides of coupling locks of a docking device which face each other, which can be flushed through with a cleaning fluid. A procedure of this type does not, however, necessarily preclude the need to fully disassemble the docking device for the purpose of more thorough cleaning and decontamination of all functional elements. Additionally, no small degree of constructional complexity is required in order to be able to provide a temporary cleaning area of this type.

In order to guarantee a consistently high degree of purity, a move has been made in the pharmaceutical industry in particular towards completely dismantling the used coupling locks and docking devices after use, and to clean all the individual parts. In order to minimize the environmental hazard, special safety precautions must be taken in cases when substances which are toxic or hazardous to health have been transported with the docking device. This procedure is in all cases still time- and work-intensive and costly. It would be desirable to be able to have recourse to coupling locks and docking devices which enable improved cleaning and which do not have the disadvantages of the prior art.

Aspects of the present disclosure therefore provide coupling locks and docking devices for the transfer in particular of toxic bulk materials, which can be cleaned quickly, simply, and reliably and to the highest level of safety.

SUMMARY AND BRIEF DESCRIPTION

In a first aspect, disclosed herein is a coupling lock (also referred to as the first coupling lock according to the invention) for a docking device for re-filling, filling and/or emptying containers, in particular in a manner which is insulated from the environment, with a locking side and a container side, comprising a pipe nozzle and a closing flap which rests in it and which can be pivoted around an axis, containing a front side which faces the locking side in the closing position, wherein the pipe nozzle has a first end on the locking side and a second end opposite on the container side, as well as an inner and an outer side, and wherein the closing flap is present on the first end, and wherein, furthermore, a first clamping element, in particular a circumferential clamping element, is present on the outer side of the pipe nozzle, which is suitable and designed for the purpose of combined engagement with a second clamping element by means of a locking clamp in order to create a temporary connection.

Suitable coupling locks with which docking devices are accessible for the transfer of bulk materials in a manner which is insulated from the environment are disclosed, e.g., in EP 1 083 137 B1, EP 1 313 658 B1, and EP 1 315 662 B1.

In the sense of the present disclosure, a locking side refers to the side of the coupling lock or pipe nozzle which faces a further, complementary coupling lock while forming a docking device from said coupling locks. Accordingly, in the sense of the present disclosure, the container side represents the side of the coupling lock or pipe nozzle which faces a container or conveyor to be emptied, or which is connected to a container or conveyor.

The first clamping element is preferably located on the outer side on the second end of the pipe nozzle, i.e., on the container side end of said pipe nozzle. The first clamping element is preferably a clamping edge which protrudes from the outer side of the pipe nozzle, such as a spring which is preferably circumferential. For example, the first clamping element can be located directly on the edge of the pipe nozzle. Alternatively, it is equally possible that the first clamping element be located on the outer side of the pipe nozzle at a distance from the edge of the pipe nozzle, and is in particular circumferential. The distance between the first clamping element and the edge of the pipe nozzle on the second end of said pipe nozzle should advantageously be selected in relation to the dimensions of the locking clamp in order to be able to establish a fixed connection by means of an engagement between the first clamping element and a further, second clamping element.

Furthermore, it can be provided that the closing flap is connected to at least one shaft, such as a drive shaft.

Coupling locks described herein are characterized according to a further embodiment by the fact that the closing flap rests on at least one side, preferably on both sides, along the axis with a partial shaft or partial shaft stump, in a bearing which is open in each case to the locking side, wherein the partial shaft(s) or shaft stump(s) is (are) suitable for forming a shaft or shaft stump when coming into contact with complementary partial shafts or partial shaft stumps of a further coupling lock, wherein the partial shaft or partial shaft stump is equipped with at least one engagement element into which a complementary engagement element can be inserted which is actively connected, or can be actively connected, to a drive.

Furthermore, according to a further embodiment, the pipe nozzle can be equipped on the inner side, at least in sections, in particular on its full circumference, with a pipe nozzle seal. Furthermore, it is possible to rest the closing flap in the pipe nozzle seal. In a particularly preferred embodiment, the coupling lock according to the invention is characterized by the fact that the pipe nozzle seal extends at least in sections beyond the second end of the pipe nozzle.

Here it can, e.g., be provided that the closing flap is provided on its outer side with at least one seal section or at least one seal which is, in particular, circumferential, which is arranged at least in sections on or adjacent to the circumference edge. In a further advantageous embodiment, it is provided that the closing flap is equipped on its outer side with at least one seal section or at least one, in particular, circumferential seal, which is arranged at least in sections on or adjacent to the edge of the circumference. Furthermore, it is possible to rest the closing flap in the pipe nozzle seal.

A further advantageous embodiment provides that the front side of the closing flap is arranged or can essentially be arranged in the closing position, at least in sections, flush with the edge of the pipe nozzle or pipe nozzle seal which faces the locking side.

Coupling locks disclosed herein also include such embodiments with which said coupling locks or their pipe nozzles can be connected or are connected on the container side to a container or a conveyor in such a manner that a seal is formed.

The bearing, bearing seat or bearing seat unit, however, in particular at least the bearing seat, are also produced with the second coupling lock according to the invention at least in sections and, in particular completely, from at least one synthetic material, in particular, from polyamide, polyetherketone (PEK), polyetheretherketone (PEEK), polyetherimide, polybutylene terephthalate (PBT), polyketones, polyimides, polyphenylene ether, polyaryl ether ketones, polyacrylnitrile, polyvinylchloride, polyolefins and/or polyoxymethylene. In the sense of the present invention, the bearing which is open towards the locking side comprises the bearing seat in which the partial shaft or partial shaft stump rests in a rotatable manner. The bearing and thus also the bearing seat can be a component of a so-called bearing seat unit.

This bearing seat unit can be a separate component or a component which is separable from the pipe nozzle.

According to a further aspect of the present disclosure, a fundamental problem is solved by means of an attachment module which comprises a coupling lock and a locking clamp which is suitable and designed for the purpose of combined engagement of the first clamping element with a second, complementary clamping element in order to create a temporary connection.

In a preferred embodiment, the attachment module furthermore has a clamp connection, in particular a flange, with a first end and a second end which lies opposite, and an inner and an outer side, wherein on the outer side, in particular on the second end, the clamping element which is, in particular, circumferential is located. The second end of the clamp connection is accordingly adjacent to or faces towards the container side when the locking clamp is used.

The above attachment modules have been proven to be particularly advantageous and user-friendly with which the pipe nozzle of the coupling lock has a pipe nozzle end seal which extends at least in sections, in particular on its full circumference, beyond the second end of the pipe nozzle on the container side.

In a first further development, an attachment module according to the invention furthermore comprises a container with a re-filling, filling or emptying opening, or a conveyor with a re-filling, filling or emptying opening, in particular a hose or a pipe, in each case with an outer and an inner side, wherein on the outer side of the container or the conveyor the second complementary element is located, which is in particular circumferential and is, in particular, an integral component of the container or conveyor.

According to the second further development, an attachment module according to the invention furthermore comprises a container with a re-filling, filling or emptying opening or a conveyor with a re-filling, filling or emptying opening, in particular a hose or a pipe, such as a clamp connection, in particular a flange, which is connected to the container or conveyor, or is an integral component of said container of conveyor, and which has a first end which faces towards the container or conveyor and a second end which lies opposite and which faces or can be turned towards the coupling lock, as well as an inner and an outer side, wherein on the outer side, in particular on the second end, the second clamping element, which is in particular circumferential, is in particular an integral component of the clamp connection.

Such an embodiment of the attachment module has been proven to be particularly advantageous in which the re-filling, filling or emptying opening of the container or the conveyor is essentially complementary in its dimensions to the end of the pipe nozzle seal which extends beyond the pipe nozzle, and wherein the end of the pipe nozzle seal which extends beyond the pipe nozzle and the re-filling, filling or emptying opening are suitable and designed for the purpose of creating a sealed contact by means of the locking clamps when the first and second clamping element engage.

In the same way, an embodiment is particularly advantageous in which the second end of the clamp connection is essentially complementary in its dimensions to the end of the pipe nozzle seal which extends beyond the pipe nozzle, and wherein the end of the pipe nozzle seal which extends beyond the pipe nozzle and the second end of the clamp connection are suitable and designed for the purpose of creating a sealed contact by means of the locking clamps when the first and second clamping elements engage.

The two particularly advantageous embodiments described above have, e.g., the advantage that the number of components of the attachment module according to the invention can be kept very low. Interestingly, as a result of this minimization in the number of components, the seal against the environment is not impeded during the transfer of bulk goods. To a far greater extent, an even higher degree of operational safety is obtained. For example, the risk is reduced of contaminating components with bulk materials, which to date has regularly made the dismantling and cleaning process more complex.

Furthermore, the present disclosure includes attachment modules according to the first and second further developments described above with which the container or the conveyor comprises on the re-filling, filling or emptying opening a seal which is at least present in sections, and which is in particular circumferential, which is complementary to the end of the pipe nozzle seal which extends beyond the pipe nozzle, and which is suitable and designed for the purpose of creating a sealed contact by means of the locking clamps when the first and second clamping element engage.

Furthermore, the present disclosure includes attachment modules in which the clamp connection comprises on the second end a seal which is at least present in sections, and which is in particular circumferential, which is complementary to the end of the pipe nozzle seal which extends beyond the pipe nozzle, and which is suitable and designed for the purpose of creating a sealed contact by means of the locking clamps when the first and second clamping element engage.

When, with the embodiments described above, on the one hand the pipe nozzle seal protrudes over the second end of the pipe nozzle, and on the other hand the opening of the container, conveyor or clamp connection or the seal on the opening of the container or conveyor are equally designed in such a manner that they can be brought into contact with the protruding seal, a pressing against each other of the opening described and the protruding seal, or of the two seals described, can be achieved, for example, in the form of so-called springs or protrusions, solely by means of the locking clamp when said clamp is closed as a result of the engagement of the first and second clamping elements which are in particular circumferential. Here, it is advantageous that an additional sealing ring, such as an O-ring, can be fully dispensed with between the first and second clamping element.

In order to increase the tightness of the seal between the first and the second clamping elements, furthermore at least one seal ring can also be provided which is suitable and designed for the purpose of creating a sealing contact between the first and the second clamping element.

In a further embodiment, it can be provided that the first clamping element represents or comprises, or is a component of a groove clamp connection and the second clamping element represents or comprises, or is a component of a flange clamp connection. Alternatively, it can be provided that the first clamping element represents or comprises, or is a component of a flange clamp connection, and the second clamping element represents or comprises, or is a component of a flange clamp connection.

A locking clamp used with the attachment module is preferably a tension clamp, in particular in accordance with DIN 32676, or a rapid lock. So-called triclamp locks are particularly preferred for use as locking clamps. Here, for example, so-called single joint and dual joint tri-clamp locks are suitable. These single and dual joint systems each have two half-collars or bracket elements. Furthermore, triple-section tri-clamp joint clamping systems can also be used. The joint and the lock or rapid lock regularly lie opposite each other with single joint and dual joint systems. When regarded in profile, the half or partial collars which form the locking clamp or tri-clamp connection have a V-shaped groove. In one embodiment, the lock or rapid lock is formed by a locking screw and a threaded nut. The locking screw preferably rests on an axle bolt of the one half-collar in such a manner that it can be pivoted.

When mounting the locking clamp or the tri-clamp lock, the first and second clamping elements, for example, in the form of protruding outer edges, engage with the V-shaped groove of the half or partial collars of the locking clamp. The locking screw can then be pivoted into the locking position. By turning the threaded nut tight, the first and second clamping elements can be pressed firmly against each other coaxially, so that a tight connection is created.

In a particularly advantageous embodiment of an attachment module described herein, it is provided that the clamp connection, in particular the second flange, is a component, in particular an integral component, of a container or conveyor, in particular of a hose.

According to a further aspect, described herein is a docking device for re-filling, filling and/or emptying containers, in particular in a manner which is insulated against the environment (first docking device according to the invention), comprising a first coupling lock according to the invention or an attachment module according to the invention, as well as a further second coupling lock which is complementary to the first coupling lock, with a locking side and a container side, comprising a second pipe nozzle and a closing flap which rests in it and which can be pivoted around an axis containing a front side which faces towards the locking side in the closing position, wherein the front sides of the closing flaps of the first and the second coupling lock are in contact with each other, or can be brought into contact with each other, and which when in contact can be pivoted from a closed position, in which they lock the transfer channel formed by the pipe nozzle of the first coupling lock and the pipe nozzle of the second coupling lock, around a shared axis into the open position. Here, the attachment module also contains the first coupling lock.

Suitable docking devices are disclosed, e.g., in EP 1 083 137 B1, EP 1 313 658 B1 and EP 1 315 662 B1.

Here, in an advantageous embodiment of the docking device, it can be provided that the pipe nozzles, in particular the pipe nozzle seals, from the first and the second coupling lock finish flush with each other when these come into contact.

Advantageously, with the above-described docking device, the closing flaps from the first and second coupling lock are essentially circular in form.

Furthermore, the docking device can be equipped with at least one drive shaft which is actively connected to a drive.

In the docking devices described above, the second coupling lock can naturally also represent or comprise a coupling lock according to the invention (first coupling lock according to the invention).

The present disclosure is based on the surprising finding that the cleaning procedure after the transfer of bulk materials can be significantly simplified when the coupling locks, attachment modules and docking devices according to the invention are used. For example, the time required for dismantling and assembly can be reduced several times over in comparison with the time required when standard bulk material transfer systems are used. The coupling lock, attachment module and docking device described herein also enable a further reduction in the risk of contamination, while at the same time significantly increasing operational safety. Thus, far fewer components are required in comparison with standard systems. In this regard, this leads to an advantage in particular over such bulk material transfer systems in which a fixed connection between the coupling lock or half-flap and a container to be emptied or filled was necessary, for example, by means of a large number of screws.

A separate further development of a coupling lock for a docking device for the re-filling, filling or emptying of containers or conveyors, in particular in a manner which is insulated against the environment (also known as the second coupling lock according to the invention) is equipped with a locking side and a container side, comprising a pipe nozzle and a closing flap which rests in it in such a manner that it can be pivoted around an axis, containing a front side which faces towards the locking side when in the closed position, wherein the closing flap rests on one side, in particular on both sides, along the axis with a partial shaft or partial shaft stump in a bearing which in each case is open to the locking side, comprising a bearing seat, wherein the partial shaft(s) or shaft stump(s) is (are) suitable for forming a shaft or a shaft stump when it (they) come into contact with complementary partial shafts or shaft stumps of a further, complementary coupling lock. In a first alternative, at least one partial shaft or at least one partial shaft stump in the front surface, preferably both partial shafts or shaft stumps, comprises at least one partially circular, in particular semi-circular guide groove, the opposite ends of which each extend up to a contact surface for a complementary partial shaft or a complementary partial shaft stump of a further coupling lock, and the bearing which is open towards the locking side comprises at least one guide rail which points to the interior of the pipe nozzle, which is partially circular, and in particular semi-circular, which is essentially complementary to the guide groove in the front surface of the partial shaft or partial shaft stump, wherein the guide groove and the guide rail which is complementary to it are suitable and designed for the purpose of engaging with each other in a form-fit manner when the closing flap is pivoted from the closed position to the open position. In a second alternative, the bearing which is open to the locking side comprises at least one partially circular, in particular semi-circular guide groove which points to the interior of the pipe nozzle, the opposite ends of which each extend up to the contact surface for a complementary partial shaft or a complementary partial shaft stump of a further coupling lock, and that at least one partial shaft or at least one partial shaft stump in the front surface, preferably both partial shafts or partial shaft stumps, comprises at least one partially circular, in particular semi-circular guide rail which is essentially complementary to the guide groove in the bearing, wherein the guide groove and the guide rail which is complementary to it are suitable and designed for the purpose of engaging with each other in a form-fit manner when the closing flap is pivoted from the closed position to the open position.

The bearing which is open to the locking side comprises the bearing seat in which the partial shaft or partial shaft stump rests in a rotatable manner. The bearing and thus also the bearing seat can be a component of a so-called bearing seat unit. This bearing seat unit can be a separate component or a component which is separable from the pipe nozzle. Here, one or in particular both bearing seat units are preferably connected or connectable with the pipe nozzle in a reversibly detachable manner.

Due to the form-fit bearing or connection of at least one bearing with at least one partial shaft, preferably of both bearings with the corresponding partial shafts or shaft stumps, a second coupling lock is obtained in which the closing flap remains undetachably connected to the pipe nozzle or the coupling lock, even during continuous operation. Surprisingly, this increase in operational safety is achieved without additional components. Quite in contrast, this coupling lock is one which guarantees a very low number of individual components and, to an equal degree, a contamination-free transfer of bulk materials.

Here, it can furthermore be provided that the guide groove and the guide rail comprise form-fit engagement elements which are complementary to each other, so that a relative axial movement of partial shaft or shaft stump and bearing is prevented, or is preventable.

This second coupling lock represents, e.g., a further development of the coupling locks disclosed in EP 1 083 137 B1, EP 1 313 658 B1, and EP 1 315 662 B1, as well as in EP 1 947 039 A1.

According to one embodiment, the coupling lock is characterized by the fact that the partial shaft or partial shaft stump is equipped with at least one engagement element, into which a complementary engagement element can be inserted which is actively connected or can be actively connected to a drive. Thus, the second coupling lock also represents a further development of the coupling locks disclosed in EP 1 947 039 A1. Here, it can furthermore be provided that the engagement element is located on the front surface of the partial shaft or of the partial shaft stump, so that this can be axially inserted into a complementary engagement element which can be actively connected or is actively connected to a drive. With this embodiment, the complementary engagement element is preferably a groove and/or at least one protrusion, in particular a pin.

Furthermore, it is possible to provide a pipe nozzle seal on the pipe nozzle of the second coupling lock, on the inner side, at least in sections, in particular on its full circumference. Furthermore, it can be provided that in the closed position, the front side of the closing flap and the side of the partial shaft or partial shaft stump, which does not rest in the bearing and which is in particular flattened, are arranged flush at least in sections.

The bearing, bearing seat or bearing seat unit, however, in particular at least the bearing seat, are also produced with the second coupling lock at least in sections, and in particular completely, from at least one synthetic material, in particular, from polyamide, polyetherketone (PEK), polyetheretherketone (PEEK), polyetherimide, polybutylene terephthalate (PBT), polyketones, polyimides, polyphenylene ether, polyaryl ether ketones, polyacrylnitrile, polyvinylchloride, polyolefins and/or polyoxymethylene.

According to a further aspect, the present disclosure provides a docking device for re-filling, filling and/or emptying containers, in particular in a manner which is insulated against the environment, comprising first and second complementary coupling locks which can be brought into contact or are in contact flush with each other via their respective locking sides, wherein the front sides of the respective closing flaps are in contact with each other or can be brought into contact with each other, and which when in contact can be pivoted from a closed position, in which they lock the transfer channel formed by the pipe nozzle of the first coupling lock and the pipe nozzle of the second coupling lock, around a shared axis into an open position, wherein at least one coupling lock, in particular both coupling locks, are those coupling locks in accordance with the second coupling lock which is described above.

Here, it can be provided that the pipe nozzles of the first and the second coupling lock, in particular the pipe nozzle seals, finish flush against each other when said locks are in contact.

Advantageously, the closing flaps of the first and second coupling lock are regularly essentially circular in form.

Naturally, the present disclosure also includes those coupling locks in which the features of the first coupling lock according to the invention and the second coupling lock according to the invention are realized jointly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
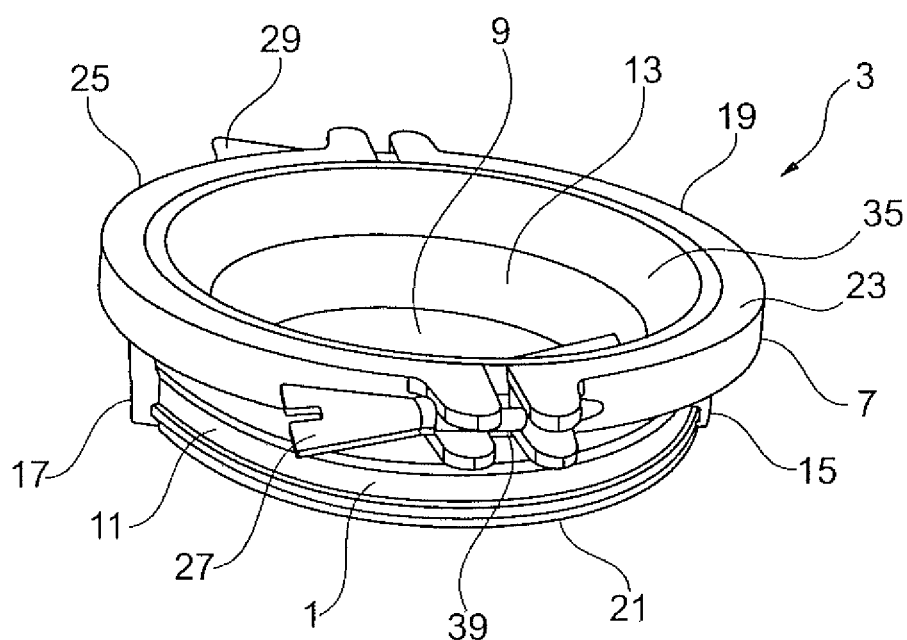
FIG. 1 shows a perspective top view of an attachment module according to the invention.

FIG. 1 shows an embodiment of an attachment module 3 in a perspective view. The attachment module 3 has a coupling lock 1 and a locking clamp 7. The coupling lock 1 is in the embodiment shown such a one as is described, e.g., in EP 1 947 039 A1. The coupling lock 1 shown has a closing flap 9, a pipe nozzle 11, a pipe nozzle seal 13 and bearing seats 15 and 17, in which partial shafts or partial shaft stumps are located (not shown in FIG. 1; see reference numerals 20 and 22 in FIG. 3). The coupling lock 1 has a container side 19 and a locking side 21. The locking side 21 is the side which is provided for coupling or docking on to the locking side of a complementary coupling lock (not shown). During this procedure, the front sides of the respective closing flaps of the respective coupling locks come into contact with each other when closed, and can be pivoted around a shared axis to form a uniform closing flap, while releasing the transfer channel formed by the pipe nozzles of these coupling locks.

Figure 2:
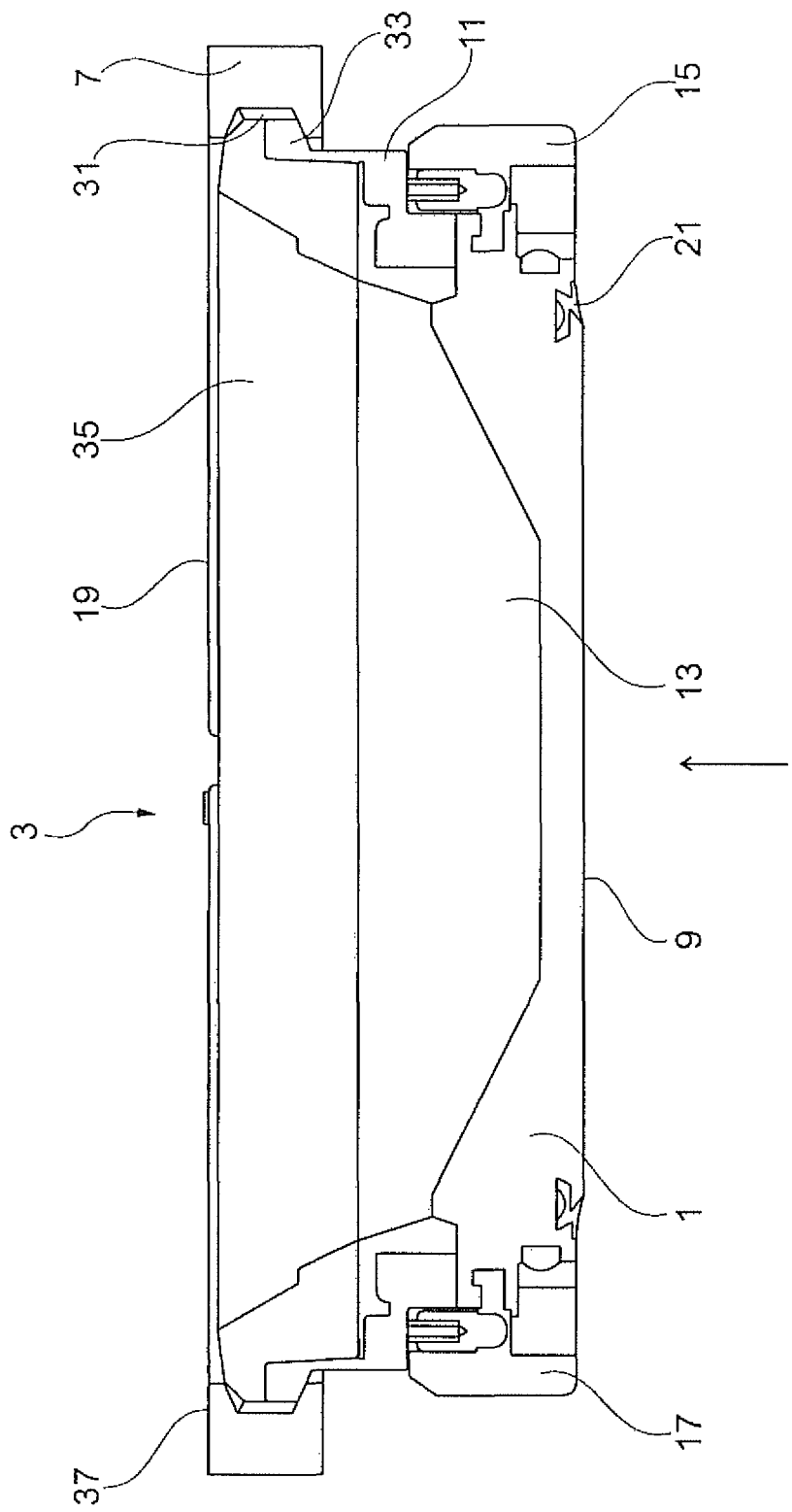
FIG. 2 shows a profile view of the attachment module according to the invention shown in FIG. 1.

The locking clamp 7 is in the embodiment shown a so-called tri-clamp connection, containing two locking clamp halves 23 and 25 which are connected to each other with the aid of butterfly nuts 27 and 29 and threaded bolts 39 and 41. The tri-clamp connection shown enables an even pressing down over the entire area. Regarded in profile, the locking clamp 7, as can be seen in FIG. 2, comprises a V-shaped groove 31. As can furthermore be seen in FIG. 2, the pipe nozzle 11 comprises on the outer side of its end on the locking side a circumferential first clamping element in the form of a protruding clamp edge 33. In the same manner, the clamp connection or flange 35, which is connected to a container to be emptied or filled, or with a conveyor (not shown), is equipped on its outer side with a circumferential second clamping element 37, which is also in the form of a protruding clamp edge. The first and second clamping elements 33 and 37 engage in the V-shaped groove 31 of the half collars 23 and 25 of the locking clamp 7. In this manner, the coupling lock 1 is securely and detachably connected to the opening or a container or conveyor.

Figure 3:
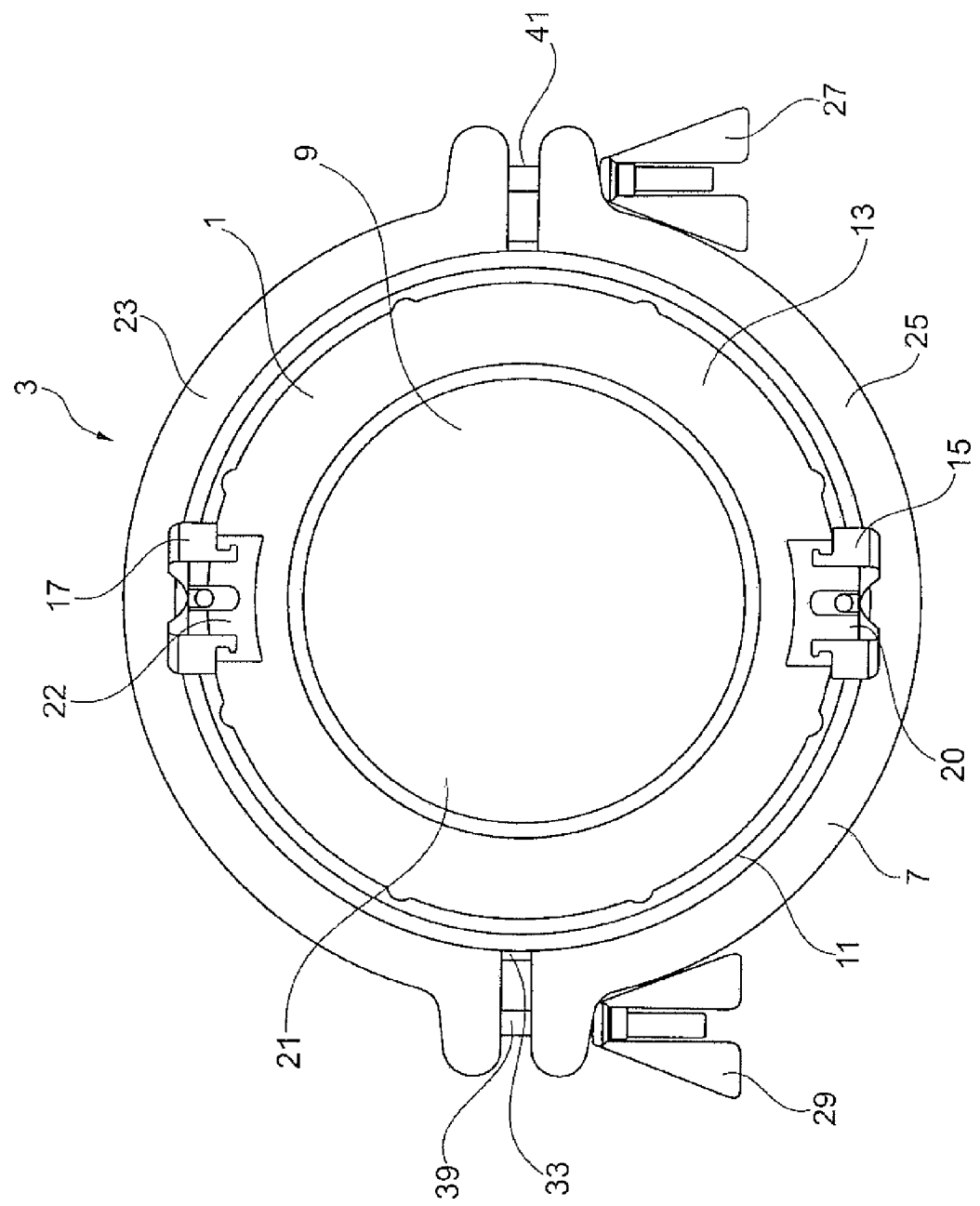
FIG. 3 shows a top view of the locking side of the attachment module shown in FIG. 1.

For better comprehension of the embodiment of an attachment module 3 shown in FIGS. 1 and 2, please refer to the top view shown in FIG. 3. FIG. 3 shows the locking clamp 7 which is compiled of the half-collars 23 and 25, and the coupling lock 1 which has been engaged. With reference to FIG. 2, FIG. 3 reproduces the view which results from the view from below onto the attachment module 3 according to the invention (see arrow in FIG. 2). The first circumferential clamping element 33, which is located on the outer side of the pipe nozzle 11, can also be seen.

Figure 4:
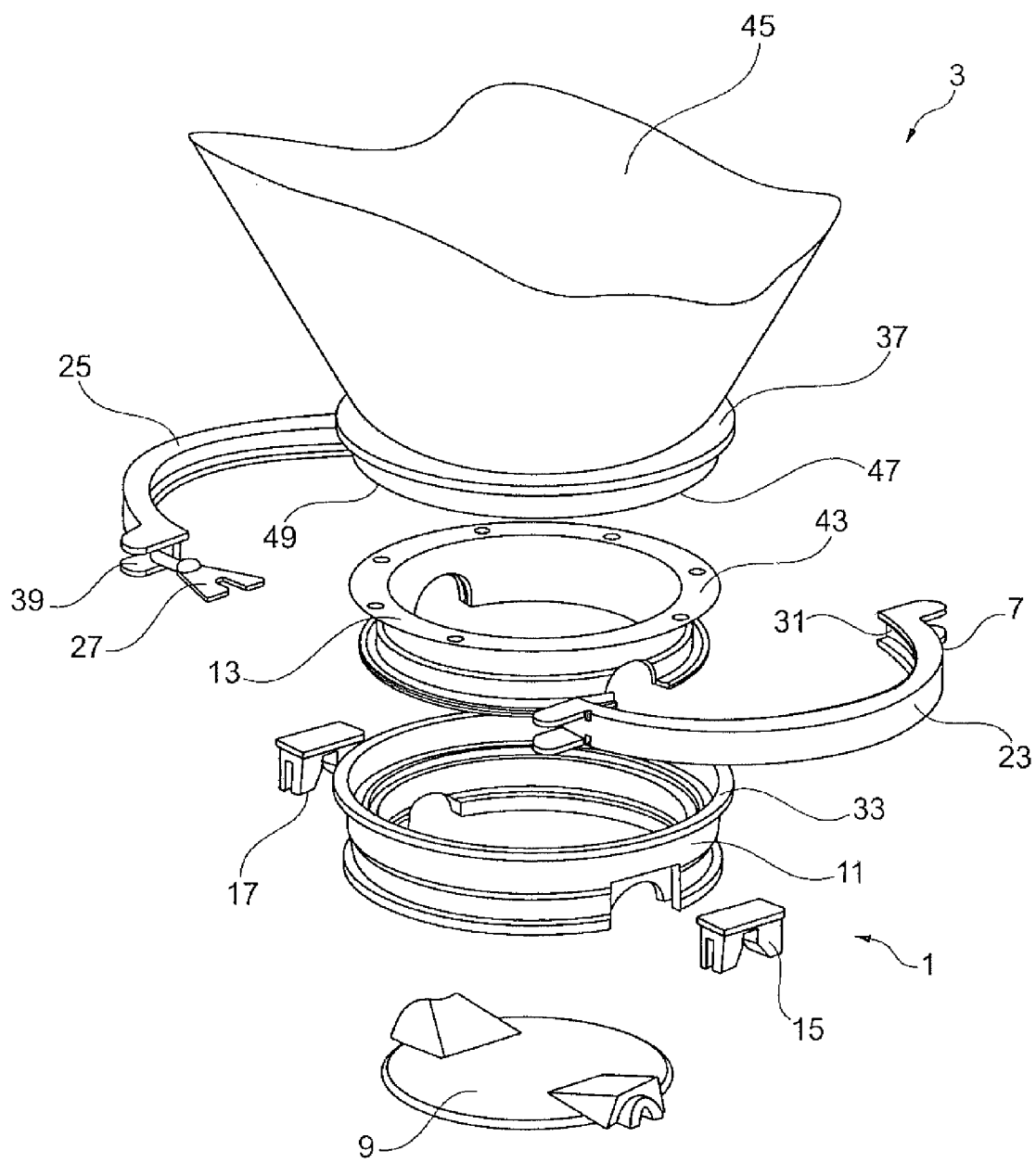
FIG. 4 shows a schematic enlarged view of an attachment module according to the invention.

FIG. 4 shows a schematic, enlarged view of an attachment module 3. It can be seen that the coupling lock 1 in the embodiment shown has a pipe nozzle 11, a closing flap 9 containing partial shafts on both sides, bearing seats or bearing seat units 15 and 17 in order to retain the partial shafts, and a pipe nozzle seal 13. The pipe nozzle seal 13 is equipped with an upper edge 43 which also extends horizontally, which protrudes over the end of the pipe nozzle 11 on the container side. The pipe nozzle 11 itself has on its second end on the container side a circumferential clamp edge 33 which extends out from the outer side. Further components of the attachment module 3 which are shown in FIG. 4 are the brackets or half-collars 23 and 25 or the locking clamp 7. The indent or groove 31 on the inner side of these brackets or half-collars 23 and 25 can also be seen, into which the first and second clamping elements 33 and 37 engage when the coupling lock 1 is connected to the container 45 also shown (at least partially) in FIG. 4. On the container opening 47 on the outer side, the second clamping element is also attached in such a manner that it surrounds said container opening in the form of a protruding edge 37. With the embodiment shown, this second clamping element 37 is a component of a flange 49 which is connected to the opening of the container.

The view shown in FIG. 4 clearly illustrates the fact that the attachment module 3 can be completely disassembled without the use of tools. In particular, no screws need to be loosened. In this manner, a very uncomplicated, reliable and in particular rapid mounting and dismantling of the attachment module according to the invention is achieved, so that in particular the cleaning procedure for the coupling locks or attachment modules according to the invention are significantly easier and less problematic than with standard systems.

Figure 5:
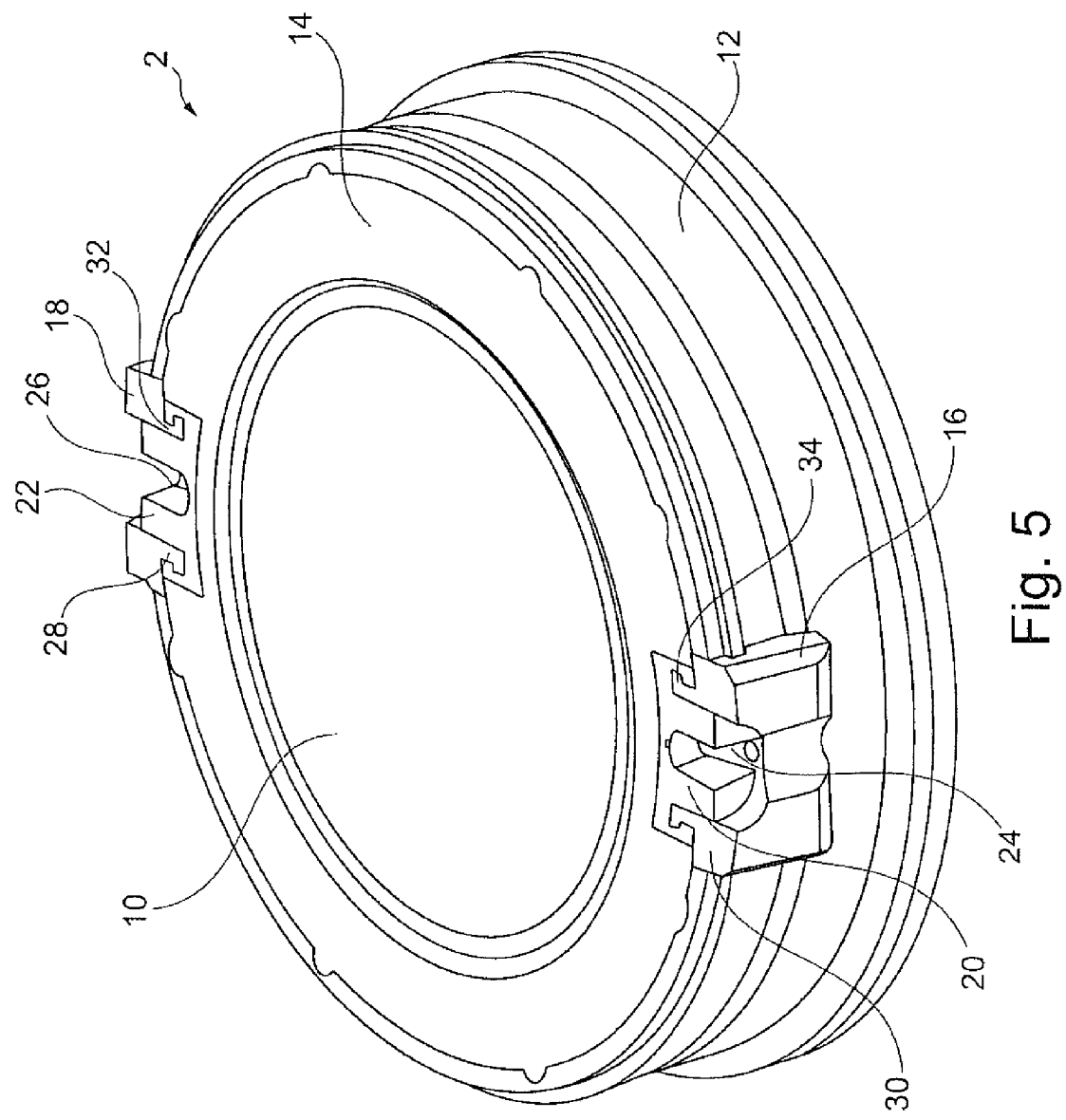
FIG. 5 shows a schematic representation of a second coupling lock according to the invention in a perspective top view.

FIG. 5 shows a second coupling lock 2. This coupling lock 2 has a closing flap 10, a pipe nozzle 12, a pipe nozzle seal 14 and bearing seats or bearing seat units 16 and 18, in which partial shafts or partial shaft stumps 20 and 22 are present which are firmly connected, while at the same time being detachable, to the closing flap 10. In the embodiment shown, indents 24 and 26 are present in the partial shafts 20 and 22 in collinear alignment with the rotational axis. These indents form with the corresponding indents in the partial shafts of a second, complementary coupling lock (not shown) engagement elements for pins or rods which can be inserted into these combined indents, and by means of which, for example in connection with a drive shaft, the closing flaps which are in contact with each other of two coupling locks which are combined to form a docking device can be pivoted from a closing position into an open position, while releasing a transfer channel formed by the two pipe nozzles of the coupling locks. These indents are an optional element of the coupling locks according to the invention.

With the second coupling lock shown in FIG. 5, it is appropriate that an essentially semi-circular groove 28 or 30 in or adjacent to the front surfaces of the partial shafts 20 and 22 be present. These grooves 28 and 30, in the embodiment shown in FIG. 5, run around at least partially the contact surfaces of the bearings for the partial shafts 20 and 22. The opposite ends of the groove open out in the contact surface of the partial shaft for the contact surface of a partial shaft of a complementary coupling lock. Spring elements 32 or 34 with complementary forms engage in the grooves 28 and 30 which are each a component of the bearing seats 16 or 18 and which accordingly extend in the direction of the interior of the pipe nozzle 12.

Furthermore, with the second coupling lock, as is shown in FIG. 5, the groove in the front surface of the partial shaft and the spring which is complementary to it must engage in a form-fit manner with each other in order to fully be able to preclude an axial relative movement of the bearing or bearing seat and the partial shaft, even when the coupling lock continues to be actuated during continuous operation. This can, as is shown in FIG. 5, be achieved due to the fact that the groove 28, 30 tapers in profile as it nears the front surface of the partial shaft. In a corresponding manner, the spring 32, 34 which is complementary to the groove 28, 30 broadens as it nears the interior of the pipe nozzle 12. Particularly preferred, as is shown in FIG. 5, is that the groove and spring which are complementary to each other are adjusted to each other with a perfect fit, so that in the axial direction, a movement invariant form-fit is guaranteed. With the second coupling lock shown in FIG. 5, it is ensured that even when one or both bearing seats 16, 18 should become loose or released, the closing flap 10 will still never fall out of the coupling lock 2, even during dismantling.

Figure 6:
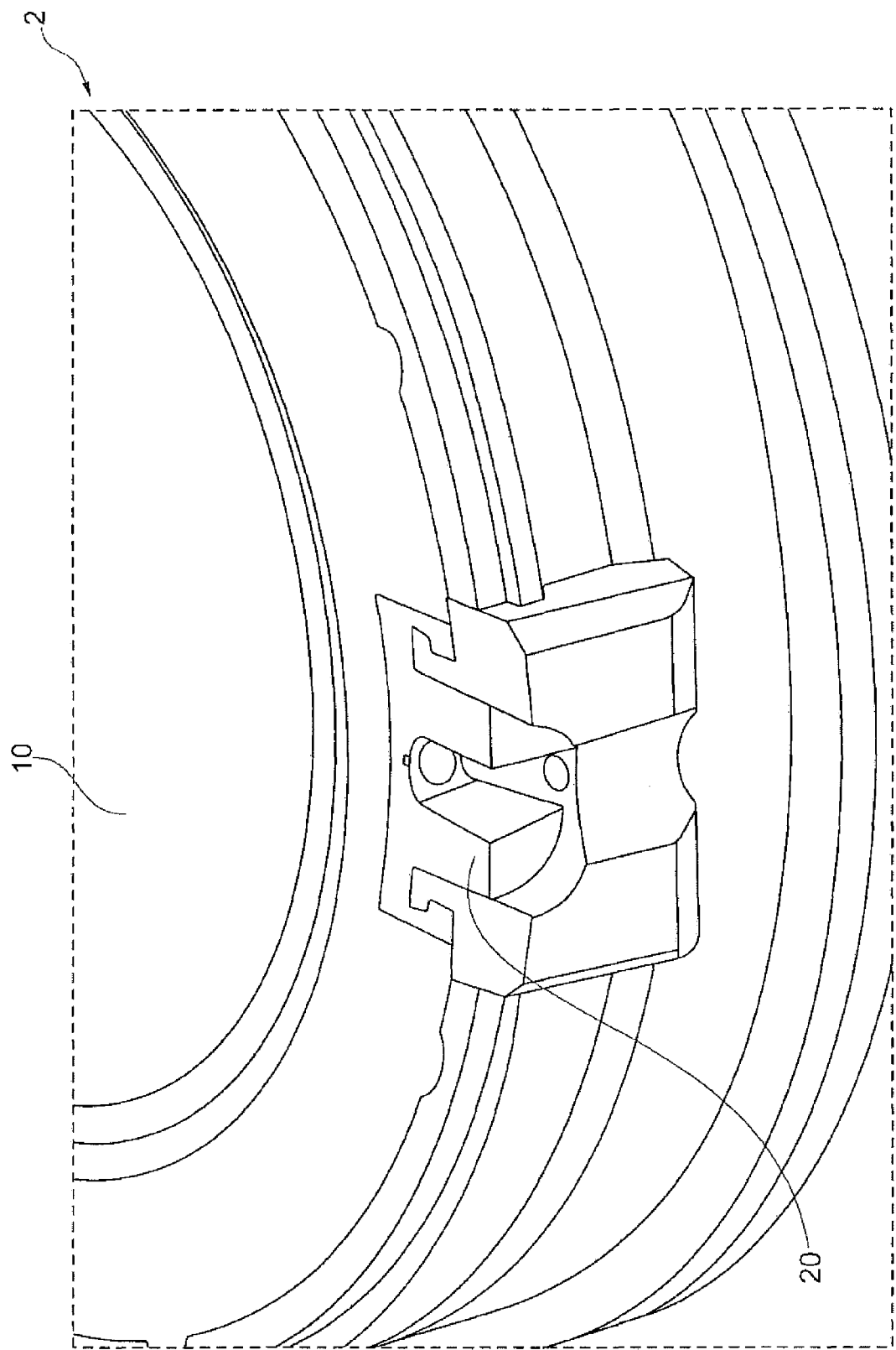
FIG. 6 shows a section comprising the bearing seat unit of the coupling lock shown in FIG. 5.

In the reproduction of the profile of the bearing seat and the partial shaft shown in FIG. 6, the functionality of the second coupling lock is again made particularly clear. The closing flap 10 with the partial shafts 20 and 22 (not shown) can be inserted into the bearing seats 16 and 18 (not shown) in such a manner that the closing flap is set onto the bearing seats rotated by an angle of 180°, in such a manner that the grooves and springs which are complementary to each other contact each other. When the closing flap is rotated around its rotational axis by 180°, the springs engage in the complementary grooves of the partial shafts. In a corresponding manner, the closing flap can again be removed from the coupling lock.

Naturally, it is also possible to combine the features of the first coupling lock, as explained in FIGS. 1 to 4, with the features of the second coupling lock as shown in FIGS. 5 and 6. An embodiment of this type is shown in FIG. 3, for example.

The features of the invention disclosed in the above description, in the claims and in the drawings can also be implemented, both individually and in any combination required for the realization of the invention in its different embodiments.

While illustrative embodiments have been illustrated and described, it will be appreciated that various changes can be made therein without departing from the spirit and scope of the invention.

The embodiments of the invention which an exclusive property or privilege is claimed are defined as follows:

1. A coupling lock for a docking device for the re-filling, filling or emptying of containers or conveyors, the coupling lock having a locking side and a container side, the coupling lock comprising:
   a pipe nozzle; and
   a closing flap that is disposed on the pipe nozzle and is pivotable around an axis, the closing flap having a front side that faces towards the locking side when in a closed position, wherein the closing flap rests along the axis with a partial shaft or partial shaft stump in a bearing that is open to the locking side, wherein the partial shaft or shaft stump is suitable for forming a shaft or a shaft stump when the partial shaft or shaft stump comes into contact with a complementary partial shaft or shaft stump of a further, complementary coupling lock, and wherein the partial shaft or partial shaft stump includes at least one engagement element into which a complementary engagement element is insertable and which is connectable to a drive,
   wherein, in a first alternative, at least one of the partial shaft or shaft stump has a front surface with at least one partially circular guide groove, the opposite ends of which each extend up to a contact surface for a complementary partial shaft or a complementary partial shaft stump of the complementary coupling lock, and the bearing, which is open towards the locking side, comprises at least one guide rail that points to the interior of the pipe nozzle, wherein the guide rail is partially circular and is complementary to the guide groove in the front surface of the partial shaft or partial shaft stump; or
   wherein, in a second alternative, the bearing, which is open to the locking side, comprises at least one partially circular guide groove which points to the interior of the pipe nozzle, the opposite ends of which each extend up to the contact surface for a complementary partial shaft or a complementary partial shaft stump of the complementary coupling lock, and wherein at least one partial shaft or shaft stump in the front surface comprises at least one partially circular guide rail which is complementary to the guide groove in the bearing, and
   wherein, in both the first alternative and the second alternative, the guide groove and the complementary guide rail are adapted to engage with each other in a form-fit manner when the closing flap is pivoted from the closed position to the open position, the guide groove and the guide rail comprising form-fit engagement elements that are complementary to each other such that a relative axial movement of a partial shaft or shaft stump and the bearing is prevented.

2. The coupling lock according to claim 1, wherein at least one bearing that is open to the locking side is a component of separate bearing seat units.

3. The coupling lock according to claim 2, wherein at least one bearing seat unit is connectable with the pipe nozzle in a reversibly detachable manner.

4. The coupling lock according to claim 1, wherein the at least one engagement element is disposed on the front surface of the partial shaft or of the partial shaft stump such that the at least one engagement element can be axially inserted into a complementary engagement element which is connectable to a drive.

5. The coupling lock according to claim 4, wherein the complementary engagement element comprises at least one groove and/or at least one protrusion.

6. The coupling lock according to claim 1, wherein the pipe nozzle includes a pipe nozzle seal on its inner side, at least in sections.

7. The coupling lock according to claim 1, wherein in the closed position, the front side of the closing flap and the side of the partial shaft or partial shaft stump which does not rest in the bearing and which is flattened, are arranged flush at least in sections.

8. The coupling lock according to claim 1, wherein the bearing in a bearing seat unit is disposed in the pipe nozzle containing the bearing, and is produced at least in sections from at least one synthetic material comprising polyamide, polyetherketone (PEK), polyetheretherketone (PEEK), polyetherimide, polybutylene terephthalate (PBT), polyketones, polyimides, polyphenylene ether, polyaryl ether ketones, polyacrylnitrile, polyvinylchloride, polyolefins and/or polyoxymethylene.

9. The coupling lock according to claim 1, further comprising:
   a first circumferential clamping element disposed on an outer side of the pipe nozzle; and
   a second circumferential clamping element adapted to engage the first clamping element by way of a locking clamp that creates a temporary connection between the first and second clamping elements,
   wherein the pipe nozzle has a first end on the locking side, a second end opposite the first end on the container side, an inner side, and an outer side, and
   wherein the closing flap is disposed on the first end of the pipe.

10. The coupling lock according to claim 9, wherein the first clamping element is disposed on the outer side on the second end of the pipe nozzle.

11. The coupling lock according to claim 9, wherein the closing flap is connected to at least one shaft.

12. The coupling lock according to claim 9, wherein the pipe nozzle includes a pipe nozzle seal on its inner side.

13. The coupling lock according to claim 12, wherein the pipe nozzle seal extends at least in sections beyond the second end of the pipe nozzle.

14. The coupling lock according to claim 12, wherein the closing flap rests in the pipe nozzle seal.

15. The coupling lock according to claim 9, wherein the first clamping element has a clamping edge which protrudes from the outer side, the first clamping element comprising a circumferential spring.

16. An attachment module comprising the coupling lock according to claim 9 and a locking clamp adapted to engage the first clamping element with a second, complementary clamping element to create a temporary connection between the first and second clamping elements.

17. The attachment module according to claim 16, wherein the pipe nozzle of the coupling lock has a pipe nozzle end seal which extends at least in sections beyond the second end of the pipe nozzle on the container side.

18. The attachment module according to claim 17, wherein the opening of the container or the conveyor is complementary in its dimensions to the end of the pipe nozzle seal which extends beyond the pipe nozzle, and wherein the end of the pipe nozzle seal which extends beyond the pipe nozzle and the opening are adapted to create a sealed contact by way of the locking clamps when the first and second clamping elements engage.

19. The attachment module according to claim 17, wherein the second end of the clamp connection is complementary in its dimensions to the end of the pipe nozzle seal which extends beyond the pipe nozzle, and wherein the end of the pipe nozzle seal which extends beyond the pipe nozzle and the second end of the clamp connection are adapted to create a sealed contact by way of the locking clamps when the first and second clamping elements engage.

20. The attachment module according to claim 17, wherein the container or the conveyor includes a seal on the opening, the seal being circumferential and complementary to the end of the pipe nozzle seal that extends beyond the pipe nozzle, and which is adapted to create a sealed contact by way of the locking clamps when the first and second clamping elements engage.

21. The attachment module according to claim 17, wherein the clamp connection comprises on the second end a seal which is circumferential and complementary to the end of the pipe nozzle seal which extends beyond the pipe nozzle, and which is adapted to create a sealed contact by way of the locking clamps when the first and second clamping elements engage.

22. The attachment module according to claim 16, further comprising a container or a conveyor having an outer and an inner side, wherein the second complementary clamping element is disposed on the outer side of the container or the conveyor and is formed as an integral component of the container or conveyor.

23. The attachment module according to claim 16, further comprising a container or a conveyor having a clamp connection which is connected to the container or conveyor, or is an integral component of said container or conveyor, the clamp connection having a first end that faces towards the container or conveyor and a second end that lies opposite of the first end and which faces or can be turned towards the coupling lock, the clamp connection further having an inner side and an outer side, wherein on the outer side at the second end, the second clamping element is an integral component of the clamp connection.

24. The attachment module according to claim 16, wherein the first and second clamping elements include clamping edges which protrude from the outer side and comprise circumferential springs.

25. The attachment module according to claim 16, further comprising at least one seal ring that is adapted to create a sealed contact between the first and the second clamping elements.

26. The attachment module according to claim 16, wherein the first clamping element comprises a flange clamp connection and the second clamping element comprises a groove clamp connection.

27. The attachment module according to claim 16, wherein the first clamping element comprises a groove clamp connection and the second clamping element comprises a flange clamp connection.

28. The attachment module according to claim 16, wherein the locking clamp is a tension clamp or a rapid lock.

29. The attachment module according to claim 16, wherein the locking clamp comprises a tri-clamp connection.

30. The attachment module according to claim 16, wherein the locking clamp comprises at least two bracket elements that are connected to each other via single or double joint systems, wherein the bracket elements comprise an groove on the side facing towards the first and second clamping elements for form-fitting engagement of the first and the second clamping element.

31. The coupling lock according to claim 1, wherein the partial shaft or shaft stump includes a head surface in an axial direction, in or on which the engagement element is located, which is insertable axially into a complementary engagement element connectable to the drive.

32. The coupling lock according to claim 1, wherein an outer side of the closing flap includes at least one of a seal section or a circumferential seal, which is arranged at least in sections on or adjacent to a circumference edge.

33. The coupling lock according to claim 1, wherein the front side of the closing flap is arranged, in the closed position, flush with the edge of at least one of the pipe nozzle or a pipe nozzle seal which faces the locking side.

34. A docking device for re-filling, filling and/or emptying containers, comprising first and second complementary coupling locks that are each constructed according to claim 1, wherein the coupling locks are adapted to be in contact flush with each other via their respective locking sides, wherein the front sides of the respective closing flaps are in contact with each other, and which when in contact, are pivotable from a closed position to an open position, in which they lock the transfer channel formed by the pipe nozzle of the first coupling lock and the pipe nozzle of the second coupling lock, around a shared axis into the open position.

35. The docking device according to claim 34, wherein the pipe nozzle seals are flush against each other when said locks are in contact.

36. The docking device according to claim 34, wherein the closing flaps of the first and second coupling lock are circular in form.

* * * * *